United States Patent [19]

Tadokoro et al.

[11] Patent Number: 5,231,626
[45] Date of Patent: Jul. 27, 1993

[54] WAVELENGTH SELECTIVE OPTICAL RECORDING AND REPRODUCING METHOD

[75] Inventors: Michihiro Tadokoro; Motomu Yoshimura; Mitsuo Maeda; Kazuo Okada, all of Hyogo, Japan

[73] Assignee: Mitsubishi Denki K.K., Tokyo, Japan

[21] Appl. No.: 859,249

[22] Filed: Mar. 26, 1992

Related U.S. Application Data

[63] Continuation of Ser. No. 204,321, Jun. 9, 1988, abandoned.

[30] Foreign Application Priority Data

Jun. 12, 1987 [JP] Japan .................................. 62-147382

[51] Int. Cl.$^5$ ............................................. G11B 7/007
[52] U.S. Cl. ..................................... 369/121; 365/119
[58] Field of Search .............. 365/119, 215, 216, 234; 369/121, 100, 102, 103, 108; 235/454, 470, 487, 457; 346/762

[56] References Cited

U.S. PATENT DOCUMENTS

| | | | |
|---|---|---|---|
| 3,896,420 | 7/1975 | Szabo | 365/119 |
| 4,101,976 | 7/1978 | Castro et al. | 365/119 |
| 4,219,704 | 8/1980 | Russell | 369/108 |
| 4,459,682 | 7/1984 | Mossberg | 365/119 |
| 4,783,776 | 11/1988 | Ishigaki et al. | 369/121 |

OTHER PUBLICATIONS

"Optical Disks Systems & Applications" Proceedings of SPIE, vol. 421, pp. 85-90, Jun. 1983.

*Primary Examiner*—Robert A. Weinhardt
*Attorney, Agent, or Firm*—Sughrue, Mion, Zinn, Macpeak & Seas

[57] ABSTRACT

A wavelength selective optical recording and reproducing method includes an optical recording and reproducing step of information composed of time series signals on a recording medium having recording tracks as position series signals with light having a variable wavelength while switching the wavelength between predetermined values.

6 Claims, 6 Drawing Sheets

WAVELENGTH SELECTIVE OPTICAL RECORDING AND REPRODUCING METHOD

This is a continuation of application Ser. No. 07/204,21 filed Jun. 9, 1988, now abandoned.

BACKGROUND OF THE INVENTION

The present invention relates to a wavelength selective optical recording and reproducing method.

Figure 10:
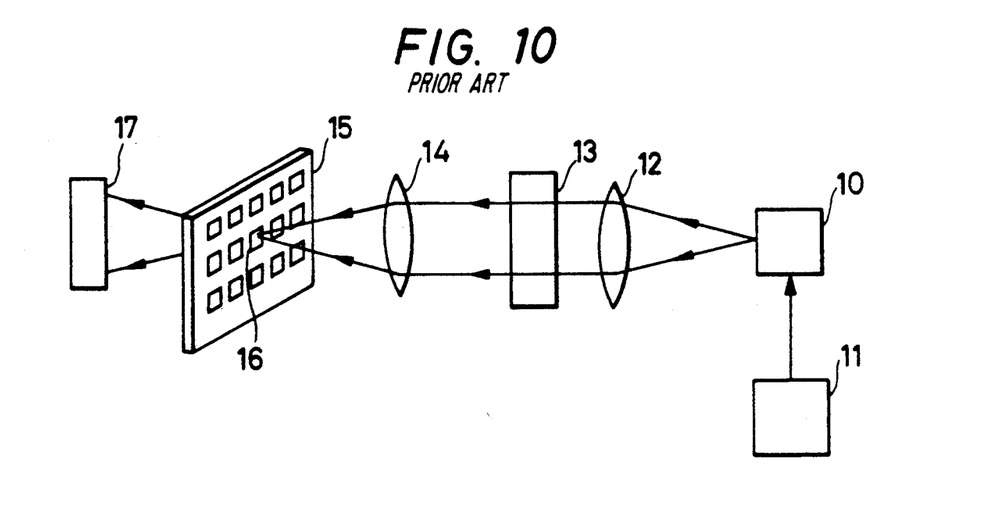
FIG. 10 shows a construction of a conventional wavelength selective optical recording and reproducing device.

An example of a conventional wavelength selective recording and reproducing device is shown in U.S. Pat. No. 4,101,976. FIG. 10 of this application shows the construction thereof schematically and FIGS. 11a, 11b and 11c correspond to FIGS. 3, 4 and 5 of the U.S. Patent, respectively.

In FIG. 10, the recording and reproducing device is constituted with a wavelength variable light source 10, a wavelength controller 11 for changing the wavelength of the light source 10, a collimator lens 12 for collimating light from the light source 10 into parallel beam, an optical deflector 13, an objective lens 14 for condensing light from the light source 10 to a minute spot and directing it onto a recording medium 15, a memory element 16 selected by the optical deflector 13 from memory elements of the recording medium 15 and an optical sensor 17 for detecting light passed through the selected memory element 16.

Light from the light source 10 is collimated by the collimator lens 12 to parallel light and after condensed by the objective lens 14 to a light spot directed onto the selected memory element 16 on the recording medium 15. The selection of the memory element is performed arbitrarily by the optical deflector 13. The principle of recording and reproducing of wavelength selective information on the selected memory element 16 will be described with reference to FIGS. 11a, 11b and 11c.

Figure 11A:
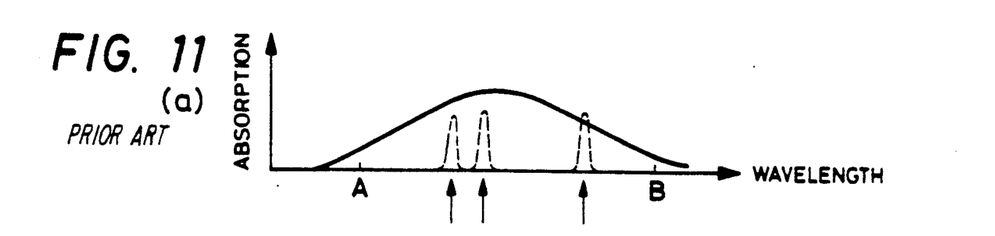
FIGS. 11a, 11b and 11c show an operation of the device shown in FIG. 10.
Figure 11B:
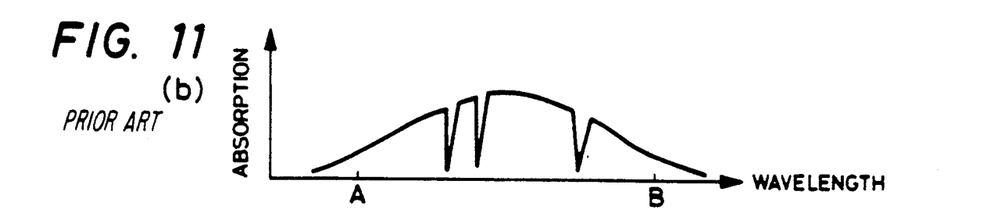
Figure 11C:
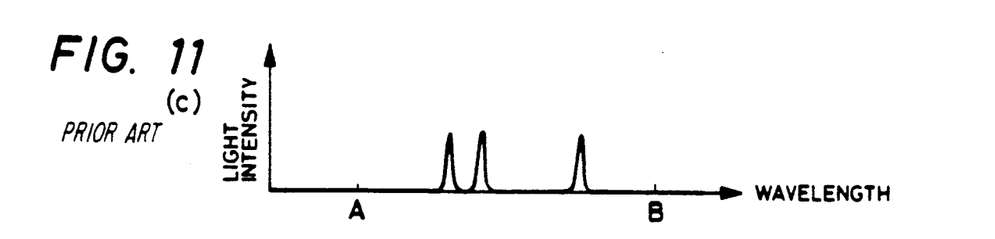

In FIG. 11a which shows an absorption spectrum of the recording medium prior to the wavelength selective recording, the spectrum is broadly spreaded. When such medium is irradiated with light having a light intensity spectrum such as shown by a dotted line in FIG. 11a, the absorption spectrum provides sharp negative spikes at wavelengths of the irradiating light as shown in FIG. 11b. The negative spike is called as "spectral hole". When such hole occurs, it is considered that a data "1" is stored at the corresponding wavelength and a data "0" is stored at any other wavelength at which no spectral hole occurs. In order to form a hole at any arbitrary wavelength, the wavelength of the light source 10 is regulated by the wavelength controller 11 to a value at the wavelength of the hole to be recorded and to increase the light intensity of the light source 10 to a value necessary to perform a recording. On the other hand, in order to readout signals from the medium on which information is recorded in wavelength selective mode such as shown in FIG. 11b, a wavelength scanning is performed from an upper limit A to a lower limit B of the memory wavelength range with the intensity of the light source 10 being constant. Since the absorptivity is reduced at the respective hole wavelength as shown in FIG. 11b, an optical intensity spectrum such as shown in FIG. 11c is obtained by detecting light that has passed through the medium 15 by using the optical detector 17. Although FIG. 11c shows the wavelength spectrum, it is possible to obtain a reproduced signal output at an output of the optical detector 17 by scanning the wavelength at a constant speed in time. The reproduced signal is in time-series, that is, a time series of signals forming information.

In the conventional wavelength selective optical recording and reproducing device constructed as above, a time series signal existing in a memory element which is wavelength-scanned to reproduce information contained therein will be lost completely if the memory element becomes inoperative for some reason.

SUMMARY OF THE INVENTION

An object of the present invention is to provide a reliable wavelength selective recording and reproducing method which is capable of compensating for a loss of information due to an inoperative portion of a memory device.

The present recording and reproducing method is based on a recording and reproducing of a time series signal, not in wavelength dimension, but as a position-series signal at different positions on the recording medium.

DETAILED DESCRIPTION OF THE PREFERRED EMBODIMENTS

Figure 1:
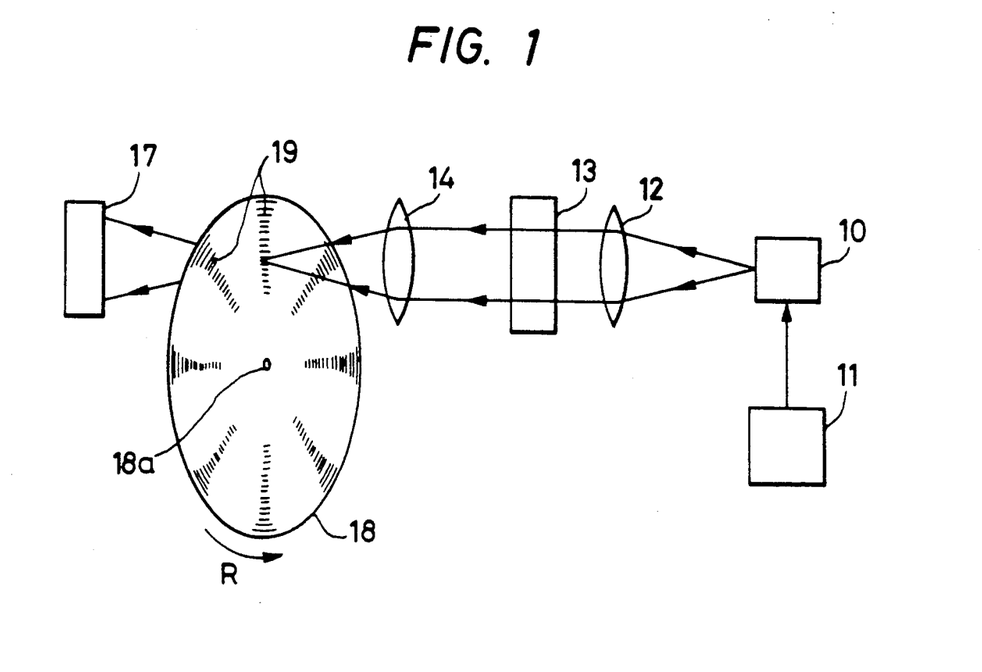
FIG. 1 shows a construction of a wavelength selective optical recording and reproducing device to which an embodiment of the present invention is applied.
Figure 2:
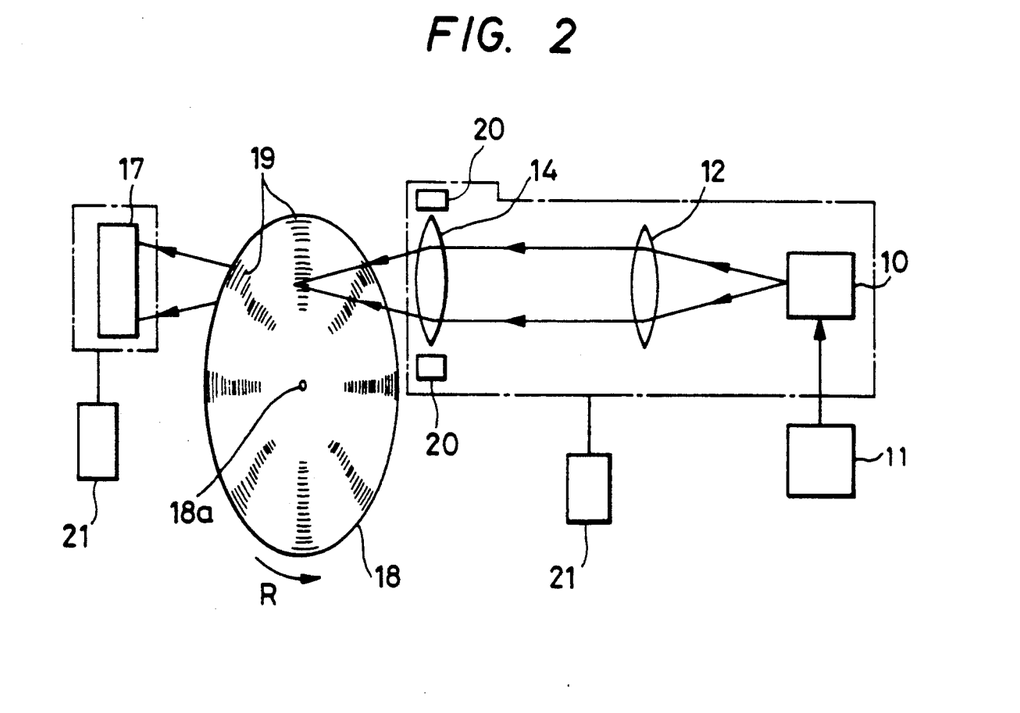
FIG. 2 shows a construction of a wavelength selective recording and reproducing device to which another embodiment of the present invention is applied.

An embodiment of the present invention will be described with reference to the accompanying drawings in which same reference numerals are used to depict same or corresponding components, respectively. A detailed description of the specific recording medium is beyond the scope of this invention. However, a suitable media is well known in the art and fully disclosed in U.S. Pat. No. 4,101,976. FIG. 1 shows an embodiment of the present invention, reference numerals 10 to 14 and 17 depict the same components as those shown in FIG. 10, respectively. Reference numeral 18 depicts a disc shaped recording medium which has a header 19 thereon. Since, in this embodiment, a function of an optical deflector 13 which is similar to that shown by the same reference numeral in FIG. 10 is to scan a light spot on the recording medium 18 in radial direction thereof, the optical deflector 13 may be substituted by a combination of an actuator 20 for driving an objective lens 14 radially and a transporting mechanism 21 for driving an optical system radially of the medium 18.

In operation, light from a light source 10 such as a semiconductor laser is collimated by a collimator lens 12 to parallel light, condensed by the objective lens 14 to a light spot and directed to the recording medium 18. The recording medium 18 is, in this embodiment, a disc and adapted to be rotated in a direction shown by an arrow R around a center 18a thereof. The medium 18 is provided at angular positions thereof with headers 19 each containing positional information.

Figure 3:
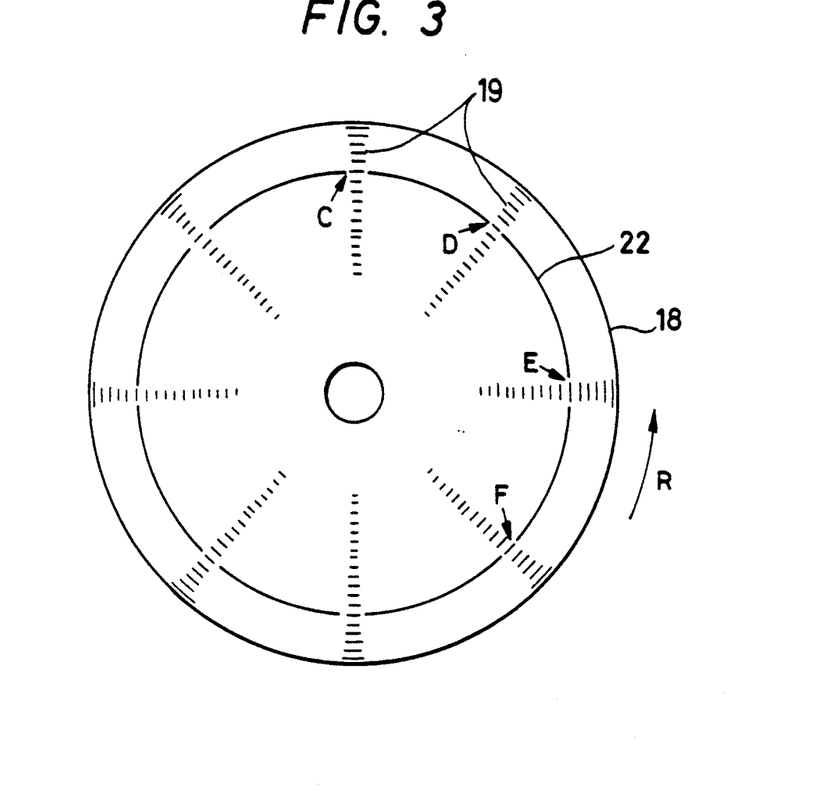
FIG. 3 shows a front view of a disc-shaped recording medium.
Figure 4:
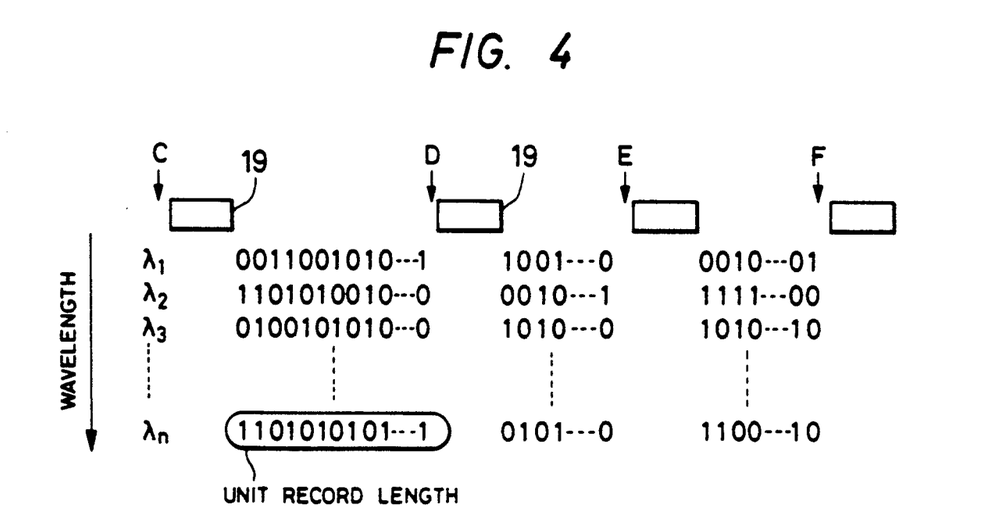
FIG. 4 illustrates the manner in which information is recorded on the disk of FIG. 3.

The light spot formed by the objective lens 14 is deflected by the optical deflector 13 to an arbitrary radial position on the medium 18. FIGS. 3 and 4 show a principle of the wavelength selective recording and reproducing at a selected radial position of the medium 18.

In FIG. 3 which is a view of the medium 18 when looked at from the side of the objective lens 14, when the light spot is positioned in a position of the header 19 shown by a capital letter C on a radial position 22 arbitrarily selected by the optical deflector 13, the light spot scans point C, point D, point E and point F sequentially in the order along the radial position line 22 with a rotation of the medium 18 in the direction R. In this case, wavelength of the light source 10 is not scanned but fixed at a certain value such as $\lambda_1$ or $\lambda_2$. Due to the rotation of the disc medium 18 in the direction R, information is recorded or reproduced at point C, D, E and F sequentially at the fixed frequency $\lambda_1$, for example. That is, the time series signal is recorded or reproduced as a position series signal. The term "position series signal" used herein means a condition where a series of signals are recorded or reproduced sequentially while changing their positions along the radial position 22.

FIG. 4 which shows a concept of the state of information recorded in the portions from the point C to the point F in FIG. 3 in succession. In this case, a unit of time series signal is expressed here as one record length defined by a distance between the headers at a specific wavelength, i.e., a distance between the points C and D at wavelength $\lambda_1$ or a distance between the points D and E at wavelength $\lambda_3$.

In a reproduction of information, a signal (in this case, 1101010010..0) from the point C to the point D is detected at a fixed wavelength $\lambda_2$.

Since the time series signal is recorded or reproduced as a position series signal, there is no such case as loss of one complete record length of time series signal even if a certain portion of the medium becomes defective and reproduction of information from that portion becomes impossible. In the present invention, possible loss of information in such situation may be several bits at most. Such small reproduction error can be corrected by means of the known error correcting method as will be well understood by those skilled in the art.

The unit of time series signal which is expressed here by one record length may be of around 1000 bits as usual. However, in order to make a longer time recording or reproducing of information possible, it is possible to lengthen the one record length or to record or reproduce the time series signal as a continuous position series signal for a longer time, as will be described later.

Figure 5:
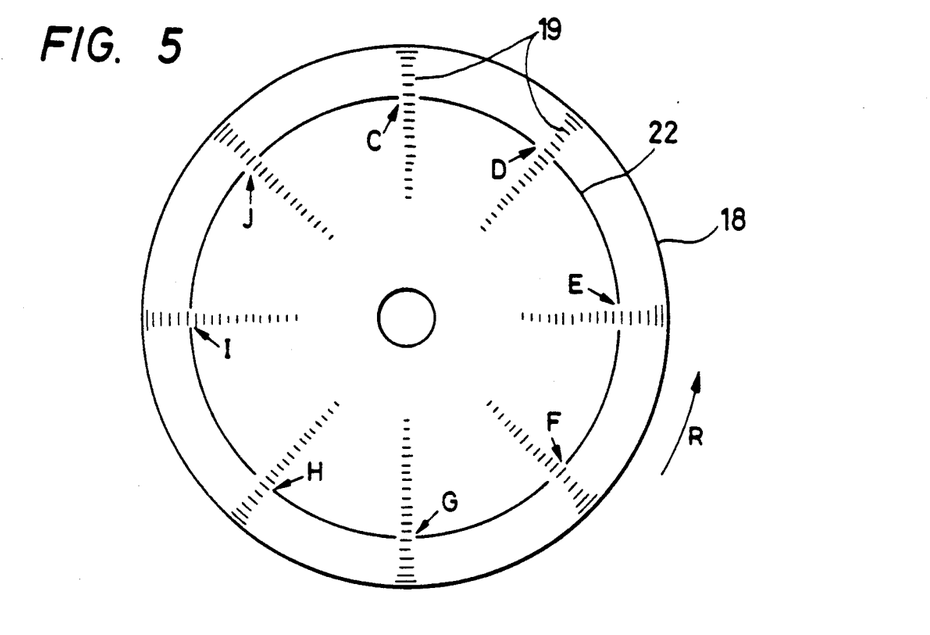
FIG. 5 shows a front view of a disc-shaped recording medium and the associated coaxial recording tracks.
Figure 6:
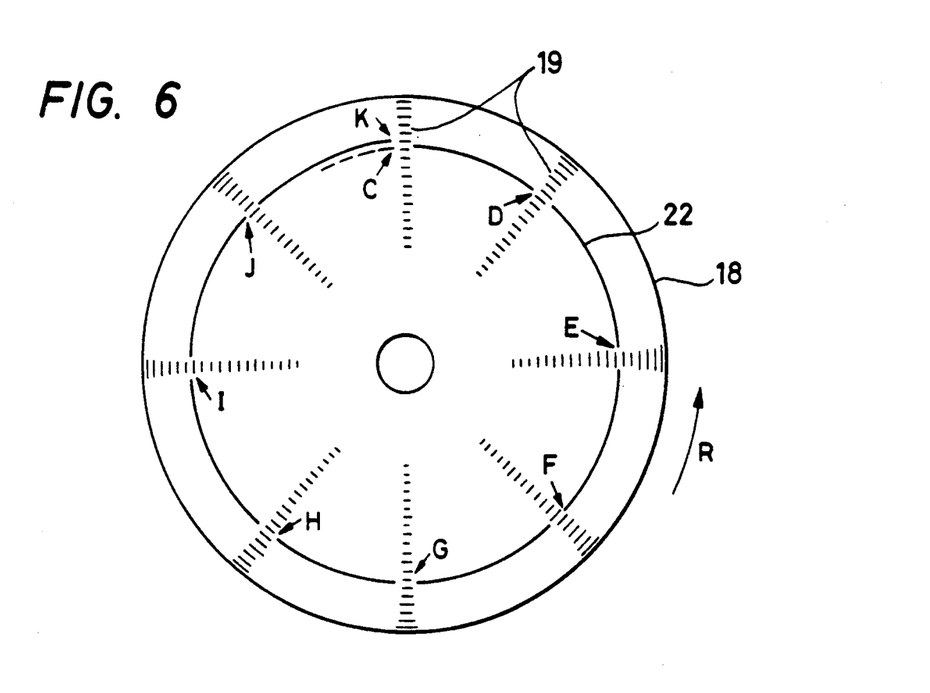
FIG. 6 shows a front view of a disc-shaped recording medium and the associated recording in spiral tracks.

Now, a case where the wavelength is fixed for not one record length but one round of a circular disc medium is assumed. FIGS. 5 and 6 show the principle of recording and reproducing under such condition, for a case where recording tracks are coaxial on the medium 18 and for a case where a single track is provided spirally on the disc medium 18, respectively.

In FIG. 5, an information is shifted from a point C to a point J, sequentially at a wavelength $\lambda_1$. In this case, due to the coaxial recording track, it is returned to the point C, finally. When the scan at wavelength $\lambda_1$ is returned to the point C, a new scan is performed along the same sequence at wavelength 2. This is repeated at wavelengths to $\lambda_1$ to $\lambda n$.

In FIG. 6, the information is shifted from a point C to a point J sequentially at wavelength $\lambda_1$. Since the recording track is spiral and includes several spiral track sections such as the spiral track section defined between the point C and point K, it is not returned to the point C but to point K which is shifted radially outwardly or inwardly of the point $C_1$ although this figure shows the point K radially outwardly of the point C. At this point, the light spot is radially shifted from the point K to the point C on the medium 18 and then the same scan is performed at wavelength $\lambda_2$. This is repeated for the respective wavelengths $\lambda_1$ to $\lambda n$.

Figure 7:
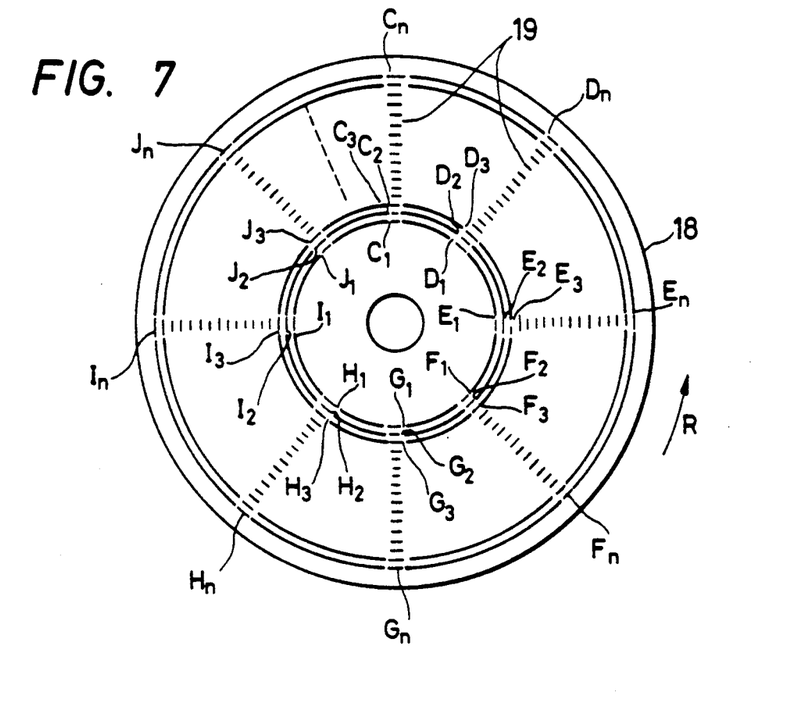
FIG. 7 shows a front view of a disc-shaped recording medium and a detailed indication of the laser movement for coaxial tracks.
Figure 8:
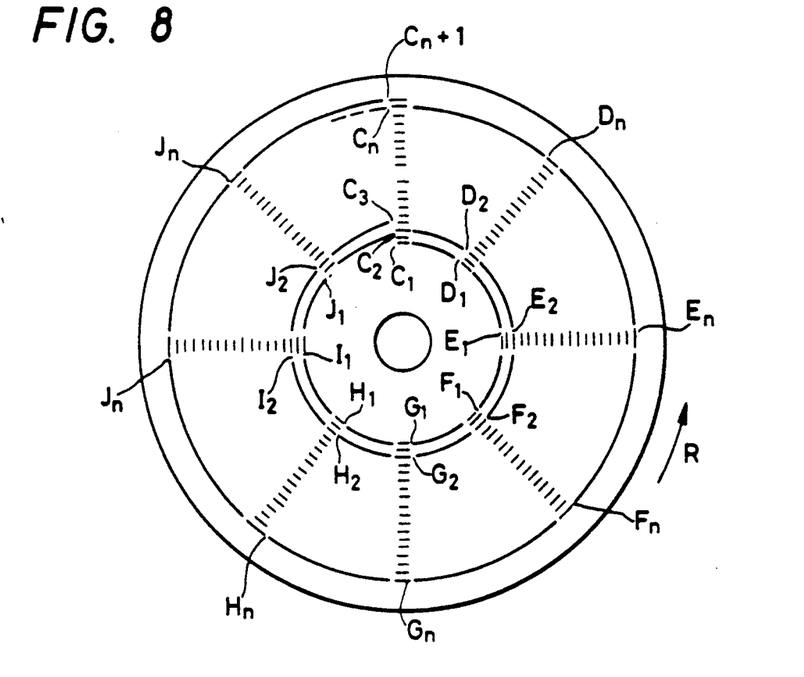
FIG. 8 shows a front view of a disc-shaped recording medium and a detailed indication of laser movement for spiral tracks.

FIGS. 7 and 8 show the principle of operation when the wavelength is fixed for not one round of the circular disc medium 18 but all of the coaxial tracks and a complete spiral track, respectively.

In FIG. 7, information is recorded or reproduced at wavelength $\lambda_1$ at a point $C_1$ on the innermost track through points $D_1$ to a point $J_1$, sequentially. At a time when it is returned to the point $C_1$, the light spot is shifted to a point $C_2$ on the next outside track and the same scan is repeated through points $D_2$ to $C_2$, and so on, with wavelength being fixed. When the scan for points Cn to Jn on the outermost track completes, the light spot is returned from the point Jn to the point $C_1$ and the scan is repeated in the same manner at wavelength $\lambda_2$. This is repeated until a scan at wavelength $\lambda n$ completes.

In FIG. 8, since track is spiral, the scan is essentially continuously performed from a point $C_1$ to $cn+1$.

At the point $Cn+1$, that is, when the spot reaches the outermost track portion, the spot is shifted radially inwardly to the point $C_1$ and the same operation is performed at wavelength $\lambda_2$. This is repeated for each respective wavelength up to $\lambda n$.

This recording and reproducing system is suitable to read and write lengthy continuous information. That is, compared with the conventional system shown in FIG. 10 in which it is necessary, in order to read or write an information long enough, to use a plurality of memory elements 16 each having a capacity of the order of 1000 bits to move the light spot from one memory element to another sequentially by the optical deflector 13 under a complicated control, it is possible in the present invention to read or write continuously lengthy information covering one complete track or tracks of the disc at one wavelength and to repeat the same at respective wavelengths. This feature of the present invention may be utilized effectively in recording or reproducing a long audio or video information.

Figure 12:
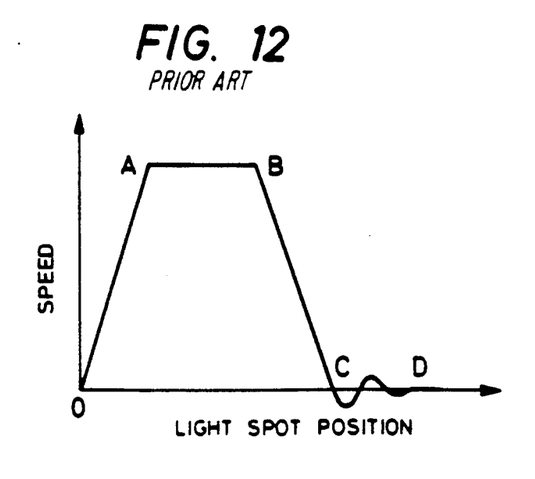
FIG. 12 shows a high speed searching of the conventional device.

As a preferred application of the present invention is to a high speed random access retrieval of information. FIG. 12 shows a speed curve of a light spot in a radial direction of a circular optical disc medium at a high speed information retrieval by an optical recording and reproducing device (cf. Proceedings of SPIE, vol. 421, pages 85 to 90). As well known, a conventional high speed retrieval is performed by moving the light spot from a recording track to another track and so on. The light spot in such high speed retrieval may traverse as many as several thousands tracks. That is, as shown in FIG. 12, the light spot initially positioned in a track position shown by a point O on an abscissa is to be moved to an aimed track position shown by a point D. The light spot is accelerated in radial direction from the point O to a point A, moved at constant speed from the point A to a point B and decelerated to a point C near the end point D. Finally, the spot is moved finely to the point D. Since the movement of the light spot is performed by moving a whole optical system in radial direction, it takes a time period as long as 100 msec to several hundreds msec to traverse such large number of tracks.

In the present invention, however, it is enough to scan a recording track or a plurality of closely arranged tracks by changing the wavelength of light source. Therefore, the time required to retrieve information can be made much shorter than that required in the conventional system.

Figure 9:
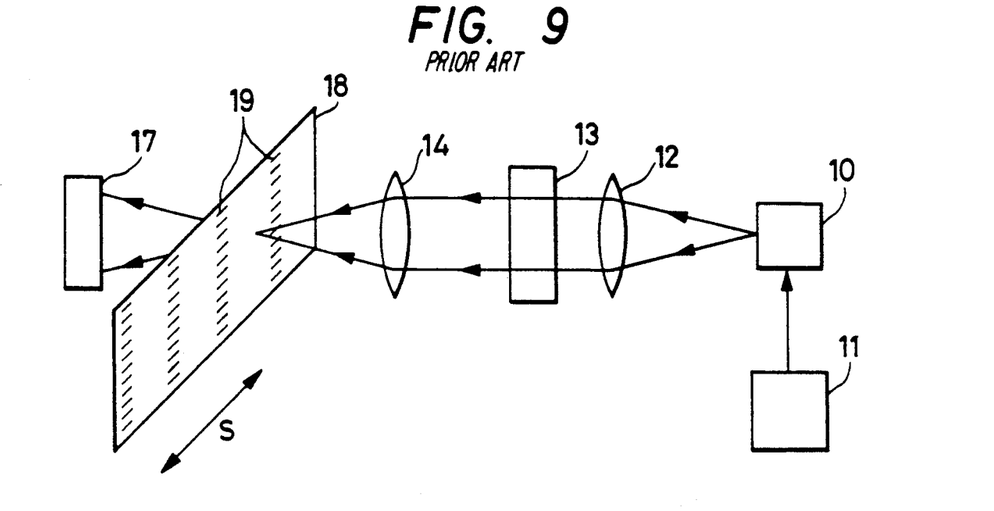
FIG. 9 shows a construction of a wavelength selective recording and reproducing device to which a further embodiment of the present invention is applied.

Another embodiment of the present invention will be described with reference to FIG. 9. In FIG. 9, a recording medium 18 is in the form of a card which is scanned in either of the two directions shown by a double arrow S. In this embodiment, a time series signal having a length corresponding to one record length is recorded and reproduced as a position series signal at the respective wavelength of scanning light. Therefore, it is possible to obtain a highly reliable optical recording and reproducing device. The length of the time series signal may be longer than one record length and the shift of light spot between tracks and the switching of light wavelength can be performed every recording track or after all tracks are scanned as in the previously mentioned embodiment.

As mentioned hereinbefore, according to the present invention, the time series signal is recorded or reproduced as the position series signal at respective light wavelengths. Therefore, the reliability of information recording and reproducing is much improved and lengthy, high speed information recording and reproducing becomes possible.

What is claimed is:

1. A method of optically recording and reproducing desired information by condensing a light beam from a wavelength variable light source on a plurality of recording track sections of a recording medium capable of being wavelength-selectively recorded and reproduced at any of a predetermined number of wavelengths, said track sections being arranged as spiral track sections on said recording medium, the wavelength of said light beam being varied by an external control signal, comprising the steps of:

a step of recording or reproducing information at only a first predetermined wavelength such that the recorded or reproduced information corresponds to more than one bit length but not more than one track section length of said recording medium;

switching said first predetermined wavelength to another predetermined wavelength by said external control signal after recording or reproducing information at the first predetermined wavelength;

a step of recording or reproducing information at only said another predetermined wavelength which is different from the first predetermined wavelength such that the recorded or reproduced information corresponds to more than one bit length but not more than one track section length of said recording medium; and continue switching the wavelength of said light beam to other predetermined wavelengths not previously used, and recording or reproducing information at said other wavelengths such that the recorded or reproduced information at each of said other wavelengths corresponds to more than one bit length but not more than one track section length of said recording medium until the desired information is recorded on or reproduced from the recording medium.

2. The method of claim 1, wherein said recording or reproducing of information at said first, another and other predetermined wavelengths is conducted on a single track section of the recording medium.

3. A method of optically recording and reproducing desired information by condensing a light beam from a wavelength variable light source on a plurality of linear recording tracks of a recording medium capable of being wavelength-selectively recorded and reproduced at any of a predetermined number of wavelengths, the wavelength of said light beam being varied by an external control signal, comprising the steps of:

a step of recording or reproducing information at only a first predetermined wavelength such that the recorded or reproduced information corresponds to more than one bit length, but not more than one track length of said recording medium;

switching said first predetermined wavelength to another predetermined wavelength by said external control signal after recording or reproducing information at the first predetermined wavelength;

a step of recording or reproducing information at only another predetermined wavelength which is different from the first predetermined wavelength such that the recorded or reproduced information corresponds to more than one bit length, but not more than one track length of said recording medium; and continue switching the wavelength of said light beam to other predetermined wavelengths not previously used and recording or reproducing at said other predetermined wavelengths such that the recorded or reproduced information at each of said other wavelengths corresponds to more than one bit length but not more than one track length of said recording medium until the desired information is recorded on or reproduced from the recording medium.

4. The method of claim 3, wherein said recording or reproducing of information at said first, another and other predetermined wavelengths is conducted on a single track of the recording medium.

5. A method of optically recording and reproducing desired information by condensing a light beam from a wavelength variable light source on recording tracks of a recording medium capable of being wavelength-selectively recorded and reproduced at any of a predetermined number of wavelengths, said tracks being arranged as coaxial circular tracks on said recording medium, the wavelength of said light beam being varied by an external control signal, comprising the steps of:

a step of recording or reproducing information at only a first predetermined wavelength such that the recorded or reproduced information corresponds to more than one bit length but not more than one track length of said recording medium;

switching said first predetermined wavelength to another predetermined wavelength by said external control signal after recording or reproducing information at the first predetermined wavelength;

a step of recording or reproducing information at only said another predetermined wavelength which is different from the first predetermined wavelength such that the recorded or reproduced information corresponds to more than one bit length but not more than one track length of said recording medium; and continue switching the wavelength of said light beam to other predetermined wavelengths not previously used and recording or reproducing information at said other wavelengths such that the recorded or reproduced information at each of said wavelengths corresponds to more than one bit length but not more than one track length of said recording medium until the desired information is recorded on or reproduced from the recording medium.

6. The method of claim 5, wherein said recording or reproducing of information at said first, another and other predetermined wavelengths is conducted on a single track of the recording medium.

* * * * *